Patented Nov. 4, 1947

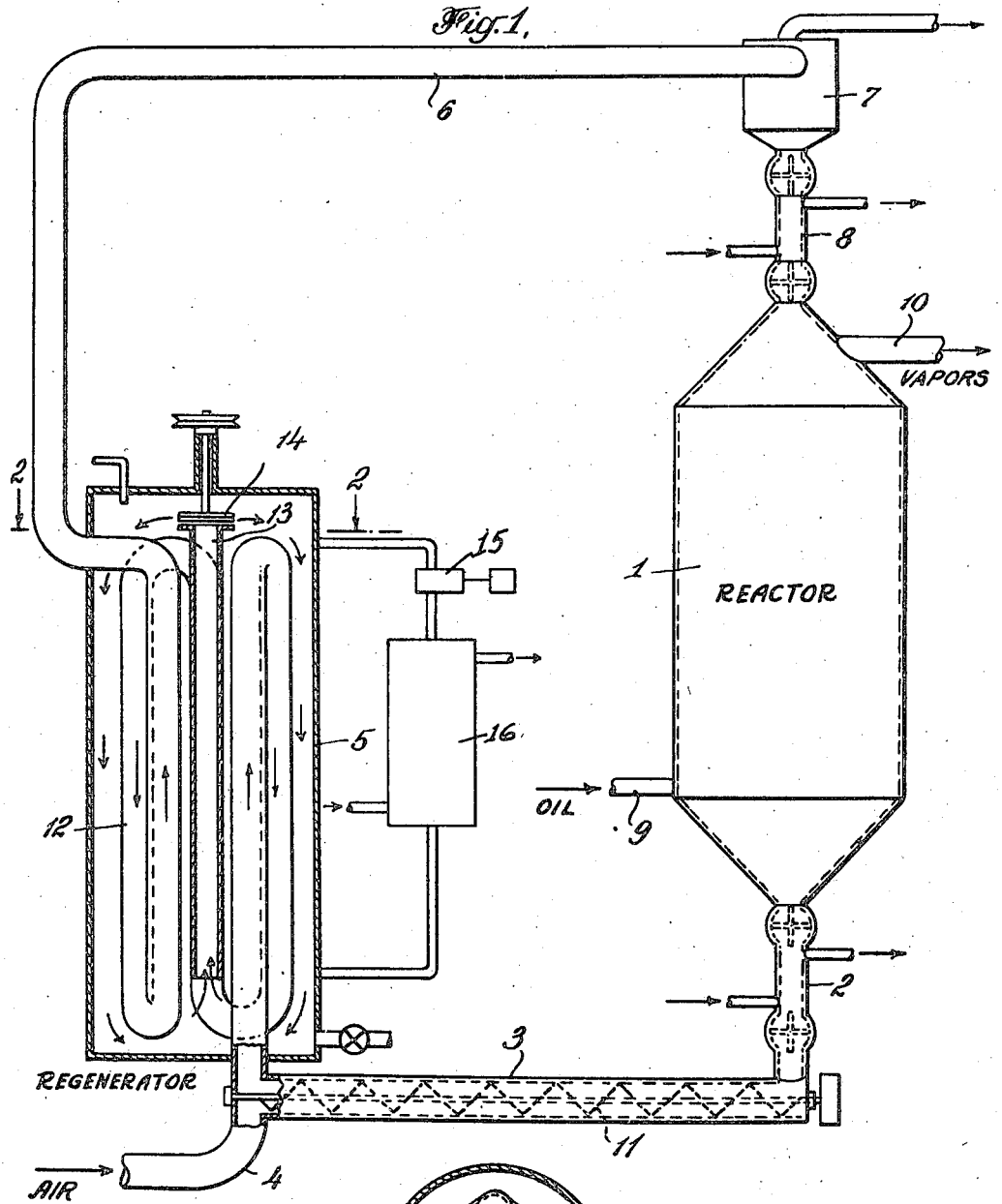
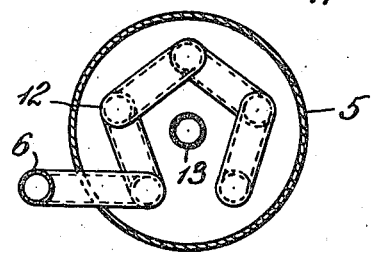

2,430,245

UNITED STATES PATENT OFFICE 2,430,245

METHOD FOR CONTINUOUS CATALYTIC OPERATION

John W. Payne, Woodbury, N. J., assignor to Socony-Vacuum Oil Company, Incorporated, New York, N. Y., a corporation of New York Application December 28, 1940, Serial No. 372,116

1 Claim. (Cl. 196—52)

This application is a continuation-in-part of my copending application Serial No. 270,943, filed April 29, 1939, now Patent 2,245,531, issued June 10, 1941.

The invention relates to apparatus for and methods of conducting reactions in the presence of a contact mass. The invention particularly relates to apparatus for and methods of conducting catalytic conversion of hydrocarbons and of regenerating the catalysts used for the conversion, invention residing in each of the single operations and the apparatus therefor, as well as, in combinations of the single operations and apparatus therefor which afford truly continuous processes and means for carrying out same.

It is known that many operations for the conversion of hydrocarbon materials to other hydrocarbon materials of differing physical and/or chemical properties may be carried out catalytically. Most of these operations are carried out by contacting the hydrocarbon, usually but not necessarily, in vapor form and at high temperature, with a contact mass composed of particles which themselves have a catalytic effect, or which are impregnated with, or act as a support for, other catalytic material of a nature appropriate to the result desired. Such operations may contemplate, for example, the conversion of hydrocarbons of high boiling point to those of lower boiling point, or the polymerization or alkylation of light or gaseous hydrocarbons to hydrocarbons of higher boiling point. Other operations of like nature are catalytic dehydrogenation, hydrogenation, desulphurization, partial oxidation and similar conversions of hydrocarbon materials. Moreover it will be obvious that the present invention may be used in certain catalytic processes using solid particle contact masses other than processes of hydrocarbon conversion. The method of operation and apparatus herein disclosed are applicable to all such catalytic conversions and processes and the subsequent regeneration of the catalyst. Of these operations, the vapor phase catalytic cracking of heavier hydrocarbons to gasoline with the subsequent regeneration of the catalyst is typical. Therefore, for convenience and simplification, this specification will hereinafter discuss this typical operation as exemplary, without, however, intending to be limited thereby or thereto except by such limits as may appear in the claim.

In the past such catalytic processes as we are here concerned with have generally made use of reaction chambers containing a fixed body of catalyst or contact mass, through which the reaction mixture is passed, and in which, after the reaction has slowed down to an uneconomical point, the contact mass is regenerated in situ. Such "catalyst-in-place" processes are not truly continuous, and a complete unit only attains continuity by the provision of numerous reaction chambers which are alternately placed on stream and on regeneration by intricate scheduling and control systems.

It is an object of this invention to provide a feasible apparatus for and method of conducting a continuous catalytic operation in which the catalyst moves in a continuous circuit through the catalyst reaction then through a regeneration reaction and then back to the catalyst reaction.

Another object of my invention is to provide a feasible process of conducting catalyst regeneration wherein the catalyst is moving during regeneration and which is capable of efficiently handling large quantities of catalyst.

Still another and most important object of my invention is to provide a feasible apparatus for and process of carrying out any of the above objects of my invention in which a catalyst may be used that is composed of particles of relatively small size such as granules and fines of say 20 or 30 mesh and finer, rather than pellet particles of larger size such as certain cracking catalysts now used in catalyst-in-place operations.

According to my invention, I provide an apparatus for and method of conducting a truly continuous catalytic operation by flowing the catalyst through a catalytic reaction zone in contact with a flowing stream of reactant, withdrawing spent catalyst from the reaction zone, flowing the spent catalyst through a regenerating zone suspended in a concurrently flowing stream of a gaseous regenerating agent while circulating a fluid heat exchange medium of suitably controlled temperature within sufficiently close proximity to, and in direct heat exchange relationship with, all spent particles in the regenerating zone that their temperature can be properly controlled, withdrawing regenerated catalyst from the regenerating zone and returning the regenerated catalyst to the reaction zone. An outstanding feature of this invention is the feasibility with which catalyst composed of relatively small particles, e. g., 20 or 30 mesh and finer may be used.

For a fuller understanding of the invention, reference is now made to the accompanying drawing which shows a preferred embodiment of our invention wherein Fig. 1 is a longitudinal view partly in section of the combination apparatus; and, Fig. 2 is a cross section of a regeneration case shown in Fig. 1 and taken on the line 2—2.

Referring to Fig. 1 there is shown reaction case 1, spent catalyst purging section 2, spent catalyst transfer line 3, air line 4, regeneration case 5, regenerated catalyst transfer line 6, cyclone separator 7, and regenerated catalyst purging section 8.

In operation active catalyst flows downwardly through case 1 in direct contact with the reactant, which, as shown, is admitted at 9 and removed at 10, and the spent catalyst empties through a vapor-sealed valve, e. g., a star-wheel valve or the like, into purging section 2. Here the spent catatlyst is purged with steam or some other inert gas to remove occluded or entrained reactant vapors. The purged catalyst passes through another vapor-sealed valve into spent catalyst transfer line 3 and is conveyed by a screw conveyor 11 to a position just below case 5, where it is picked up by air introduced through line 4 and carried in suspension through coil 12 of case 5. The catalyst is regenerated while passing through coil 12 and leaves case 5 still suspended in the air, which by that time is largely combustion gases, and is carried thereby through transfer line 6 to cyclone separator 7. Here the regenerated catalyst settles out from the air and passes through a vapor-sealed valve to purging section 8 for removal of occluded and entrained air, and then passes through another vapor-sealed valve back into reaction case 1 ready to start through the cycle again.

The reaction case may be of any suitable type which permits the catalyst to flow therethrough in contact with the reactant, as, for instance, any of the type cases shown in the copending applications S. N. 361,440, filed October 16, 1940, and S. N. 362,882 filed October 25, 1940. Also if desired, a reaction case may be used wherein the cataylst passes therethrough suspended in the reactant, similarly to the way it is conveyed through regeneration case 5 suspended in air. This latter type case would require, of course, a cyclone separator or the like for separating the spent catalyst from the reactant vapors. Regardless of what reaction type case is used, it may be provided with a liquid heat exchange medium for temperature control or may be used without a heat exchange medium.

Since, in the usual operation, hydrocarbon vapor is the reactant in the reaction case, and air is the gaseous agent in the regeneration case, the catalyst should pass from one case to the other without permitting any substantial intermingling of the gaseous materials in the two cases. For this purpose, we disclose conventional star-wheel valves for admitting and discharging catalyst to and from each case. It is apparent any other means which will accomplish the desired result could be used. For the same reason, we provide purging section 2 for the spent catalyst passing from case 1 to case 5, and purging section 8 for the regenerated catalyst passing from case 5 to case 1. In these purging sections a suitable purging agent is forced through the flowing particles to remove occluded vapors or gases (or liquid, if such should be used instead of vapors in a reaction case). It is to be understood that in the event either or both purging operations are found to be unnecessary, they may be eliminated.

If the spent catalyst flowing from purging section 2 into transfer line 3 is below kindling temperature or regeneration temperature, as it might be when carrying out some reactions, the catalyst could be picked up at that point by the gaseous regenerating agent and conveyed to and through case 5. However, for reactions, such as cracking, the catalyst may be above the kindling temperature of carbonaceous impurities thereon, and, therefore, it is better to convey the spent catalyst by some other means, such as screw 11, to a point close to case 5 before introducing air so that the catalyst enters the temperature-controlled regeneration case almost as soon as it is picked up by the regenerating medium.

Case 5 is equipped with a long tubular coil 12, or a similar gas passage means defined of heat conducting material, which coils through the case to give a sufficient length of travel to the air and catalyst for proper regenerating contact time so that when the catalyst leaves case 5 it is fully regenerated. For temperature control, case 5 is filled with liquid heat exchange medium which completely immerses coil 12 whereby all portions of the coil are surrounded on all sides by the liquid heat exchange medium.

As shown, coil 12 comprises a tube bundle composed of a plurality of tubes (see Fig. 2) of relatively small cross section connected in series by suitable return bends. These tubes are mounted around a central passage 13 which has both of its ends open to the interior of the chamber and thus permits circulation of the liquid heat exchange medium therethrough. The circulation of the heat exchange medium up through passage 13 and back down around the tubes is effected by means of ejector impeller pump 14, located just above the top opening of passage 13. The shaft of impeller 14 extends up through the top cover plate of case 5 and is rotated by suitable means (not shown).

The temperature of the circulating heat exchange medium may be controlled by a suitable heating or cooling means provided around the interior or exterior of case 5. It is to be understood that, if desired, the temperature control and circulation of heat exchange medium may be obtained by other means, such as, for example, circulating the medium through an exterior circuit containing a pump 15 and heater or cooler 16.

In order to afford proper temperature control over the catalyst being regenerated, every catalyst particle during its entire regeneration period should be in close proximity to the temperature controlled, fluid heat exchange medium. Therefore, tube or coil 12 must be of comparatively small diameter, for example, not over 3 or 4 inches outside diameter. The greatest permissible tube diameter will depend somewhat on the catalyst being regenerated, the amount of deposit thereon, rate of flow, etc. A tube of 1½ inch inside diameter is a particularly feasible and satisfactory size for usual alumina-silica cracking catalyst.

For economical reasons, the catalyst passing from each case to the other case should not be permitted to cool down to atmospheric temperature, but rather should be maintained in a heated condition at all times in the cyclic process. By passing the catalyst to the next case while in a heated condition, a material advantage of operation is obtained in that time and space in the case are not required for merely heating the catalyst up to the desired treating temperature, or, at least, in heating the catalyst all the way from atmospheric temperature to the treating temperature. In some operations, it may be found desirable or necessary to place catalyst surge tanks or the like in the catalyst flow lines in order to give greater flexibility to the timing of the operations. If advisable in such operations, means for heating the catalyst at these stages may be provided so that it retains a heated condition.

Cracking of petroleum oils is an endothermic reaction, and, therefore, an exact temperature control means of the nature essential for regeneration of spent catalysts by the exothermic reaction of combustion is not required, and, if desired, may be dispensed with. On the other hand, the usual petroleum conversion catalysts such as those, for example, of the clay type, including both natural and synthetic alumina, silica, and alumina-silica compositions, are heat sensitive to temperatures not far above the most efficient combustion or regenerating temperatures for removing combustible impurities, and may be substantially damaged by these higher temperatures. Accordingly, great care should be taken to maintain the regeneration temperature range between the minimum regenerating temperature for the particles and the maximum regenerating temperature that does not cause substantial heat damages. This desired regenerating temperature range can be closely maintained by use of properly temperature-controlled liquid heat exchange medium.

In order to obtain proper temperature control, the heat exchange medium must be adjusted to a proper temperature for extracting or adding the necessary heat. Moreover, the heat exchange medium must be circulated in sufficient amount in close indirect heat exchange with every catalyst particle and then cooled or heated to readjust its temperature by means extraneous of the reaction heat before the medium's temperature reaches an undesired value. In this way liquid heat exchange medium in our invention continuously controls the temperature of the zone making immediate compensations for temperature changes whereby no deleterious temperatures occur.

When the operation is first started the heat exchange medium may add some heat to help initiate combustion or at least the medium should not be at such a low temperature as to prevent combustion initiation. After combustion is started, operations by our invention are so efficient that heat is extracted from the exothermic regeneration reaction, i. e., in the usual case such as regeneration of cracking catalysts by burning. Therefore, contrary to many processes of burning which add heat, e. g., by hot combustion gases of exceptionally high temperatures, and thereby endanger the catalyst or reaction by overheating, my invention employs a heat exchange medium which is maintained at all points in the regenerating zone at a temperature below temperatures which are injurious to the catalyst or to the regeneration being carried out, and, of course, at a temperature above which undue cooling occurs.

While temperature-controlled, circulating gaseous heat exchange mediums of high specific heat might be used in some instances, I greatly prefer the use of liquid heat exchange mediums since necessary pumping and pressure facilities for proper use of even the best gaseous mediums, e. g., hydrogen, would, in many cases, render the operation commercially impractical.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of cracking catalysts, we prefer the use of fused salts. A particularly preferable mixture of this kind is a mixture of the alkali metal salts of nitric and nitrous acids. In certain cases suitable liquid heat exchange mediums might be found which have a boiling point around the desired operating temperature, in which case, the heat exchange medium would be kept predominantly in the liquid state but might undergo some transition whereby advantage could be taken of its heat of vaporization or condensation.

In the preferred practice the heat exchange medium is maintained at substantially the temperature of the treatment being controlled, e. g., above the minimum temperature at which proper reaction is obtained and below the minimum temperature at which deleterious results occur such as damage to the catalyst. Such practice may be carried out very effectively when the heat exchange medium is a liquid and has a relatively high specific heat and the structure of the apparatus is such that heat exchange medium is brought within close proximity to every granule in the apparatus. Hence considerable fluctuations in temperature in either direction can be compensated by the liquid heat exchange medium without substantially altering its temperature and suitable cooling or heating of the heat exchange medium in its circuit maintains the liquid at the treating temperature.

The maximum distance that each catalyst particle may be from the liquid heat exchange medium in the regenerating zone may vary with the catalyst treated, the atmosphere in the burning zone, the amount and nature of impurities being removed, mass velocity of gaseous regenerating agent, physical properties of the liquid heat exchange medium, etc. Accordingly, it would be difficult to specify one maximum distance that may be used for every regeneration. However, in general, this maximum distance should not exceed about 1½ to 3 inches in any regeneration case in order to afford proper temperature control, and a maximum distance of about ½ to 1½ inches seems to be well suited for the regenerating of the spent clay or alumina-silica cracking catalyst. And in general there should be provided at least ½ cubic inch of liquid heat exchange medium for each cubic inch of regenerating space.

The mass velocity of the liquid heat exchange medium, of course, depends upon the specific heat and other characteristics of the medium in operations where it is desirable to maintain the adsorbent at a relatively uniform temperature. A suitable mass velocity is best defined as that mass velocity of heat exchange medium which will extract the required amount of heat while undergoing a temperature rise of not more than 50° F. and preferably from 2° to 10° F.

The air rate should be sufficient to freely flow and carry the catalyst particles. It is preferable to use the minimum velocity which will accomplish this result so that the longest possible contact time will be afforded for a given length of apparatus.

In order to show specific application of my invention to the construction and operation of catalyst regeneration cases, I give in Table I below specific data for a regeneration case that embodies a highly satisfactory construction of the present invention. The particular data given is for a practical regeneration of a clay cracking catalyst carrying up to about 3% of coke and using a molten salt heat exchange medium. It is to be understood that the invention is not limited to the data of Table I as there may be variations as indicated elsewhere herein.

Table I

| | |
|---|---|
| Length of case _____ feet__ | 25 |
| Diameter of case _____do__ | 8 |
| Length of catalyst path _____do__ | 150 |
| Size of catalyst tube_____inches (I. D.)__ | 1.5 |
| Amount of heat exchange medium in chamber (cu. in./cu. in. of catalyst space) _____ | 0.5 |
| Maximum distance of clay particles from heat exchange surface_____inches__ | 0.75 |
| Coke (per cent by weight of catalyst)_____ | 3.0 |
| Clay thruput (lbs./hr./cu.ft. of catalyst space) _____ | 20 |
| Air rate (cu.ft./min./cu.ft. of catalyst space) _____ | 2.5 |

As stated above, during regeneration in accordance with my invention, the maximum distance of any catalyst particle from the heat exchange medium and the minimum amount of heat exchange medium may vary somewhat depending on certain factors. As a preferred range which will be found satisfactory for most regenerations, I give the following data in Table II.

Table II

| | |
|---|---|
| Maximum distance of particles from heat exchange surface_____inches__ | 0.5–3 |
| Amount of liquid heat exchange medium in chamber per unit volume of space for catalyst_____ | 0.3–0.9 |

It will be understood that while best designs for operation in accordance with this invention are obtained by observing the limits and ranges set forth above, a gradual approach to such limits and ranges will naturally begin to produce some of the advantages obtained by the present invention. There is therefore, a border line range of relationship which does not yield the results obtainable by practice of the preferred form of invention but within which some of the advantages of the invention begin to be realized. For the purpose of defining this border line range, I give below figures defining relationships beyond the limits of which operating difficulties would arise which would seriously impair the efficiency of the process and which would increase the cost to most undesirable levels as compared with my preferred design operation.

Table III

| | |
|---|---|
| Maximum distance of particles from liquid heat exchange medium__inches__ | 0.25–6.0 |
| Amount of liquid heat exchange medium in chamber per unit volume of space for catalyst_____ | 0.15 to 1.5 |

The catalytic cracking of petroleum oils to gasoline may be conducted at temperatures in the catalyst mass, as is known, between about 810° and 950° F., and preferably between 825° and 900° F. And when cracking petroleum vapors in contact with a flowing stream of catalyst, as disclosed herein, the rate of flow of petroleum vapors is governed by the same mechanical principles applicable to the flow of the gaseous regenerating agent.

The temperature of regeneration of a spent clay cracking catalyst by burning off carbonaceous impurities ranges from around the cracking temperature to a peak temperature of about 1050° F. The most efficient and effective regeneration being accomplished during the time the spent catalyst is at a temperature between 1000° and 1050° F. However, great care should be exercised that no catalyst particles are subjected to a temperature much above 1050° F., for example, above 1200° F., or serious damage to said catalyst particles may result. It is to be noted further that because the regeneration case is always on regeneration and therefore each part of the case remains at substantially a given temperature, it is not necessary to use pre-heated air as air at atmospheric temperature may be introduced into the case quite feasibly. On the other hand, the use of preheated air is preferable as it increases the capacity of the case.

I claim:

In a catalytic cracking operation wherein a heavier petroleum reactant is cracked to gasoline by directly contacting it with solid catalyst particles at elevated temperatures and spent catalyst from said cracking reaction is regenerated by burning off carbonaceous deposits with air, the improvement which comprises flowing active particles of the catalyst through a cracking zone in direct contact with a stream of said petroleum reactant under cracking conditions, withdrawing spent catalyst from said cracking zone, passing said spent catalyst particles into a regenerating zone suspended in and carried by a stream of air flowing concurrently therewith without permitting such particles to cool to atmospheric temperature, flowing said spent catalyst under regenerating conditions, through said regenerating zone suspended in and carried by said stream of said air flowing concurrently therewith while restricting said stream of air to a cross-section of less than about six inches in at least one transverse dimension, circulating a sufficient amount of liquid heat exchange medium, maintained within a regenerating temperature range between the minimum temperature of combustion for the carbonaceous deposits on the spent catalyst and a top temperature of about 1050° F., within at most about three inches of all catalyst particles in the regenerating zone, but out of direct contact therewith, so that the temperature of such particles is maintained within said regenerating temperature range, returning regenerated catalyst particles from said regenerating zone to said cracking zone without permitting them to cool to atmospheric temperature, and preventing said petroleum reactant passing into said regenerating zone at all times and preventing said air passing into said cracking zone at all times.

JOHN W. PAYNE.

REFERENCES CITED

The following references are of record in the file of this patent:

UNITED STATES PATENTS

| Number | Name | Date |
|---|---|---|
| 1,987,905 | Houdry _____ | Jan. 15, 1935 |
| 2,161,677 | Houdry _____ | June 6, 1939 |
| 2,209,973 | Houdry et al. _____ | Aug. 6, 1940 |
| 2,231,231 | Subkow _____ | Feb. 11, 1941 |
| 2,240,347 | Page, Jr., et al. _____ | Apr. 29, 1941 |
| 2,065,643 | Brandt _____ | Dec. 29, 1936 |
| 2,079,158 | DeRachat _____ | May 4, 1937 |
| 2,196,229 | Prickett _____ | Apr. 9, 1940 |
| 2,248,196 | Plummer _____ | July 8, 1941 |
| 2,074,456 | Carleton _____ | Mar. 23, 1937 |
| 2,289,329 | Prickett _____ | July 7, 1942 |